United States Patent [19]

Kraynick

[11] Patent Number: 4,754,993
[45] Date of Patent: Jul. 5, 1988

[54] CONDUIT HARNESS CONNECTOR ASSEMBLY

[75] Inventor: Joseph Kraynick, Canton, Ohio

[73] Assignee: Handy & Harman Automotive Group, Inc., Dover, Ohio

[21] Appl. No.: 924,249

[22] Filed: Oct. 28, 1986

[51] Int. Cl.$^4$ .............................................. F16L 39/02
[52] U.S. Cl. .................................. 285/137.1; 285/158; 285/319; 285/423; 285/915
[58] Field of Search .................... 285/137.1, 162, 158, 285/319, 915, 423

[56] References Cited

U.S. PATENT DOCUMENTS

| | | | |
|---|---|---|---|
| 2,517,717 | 8/1950 | Rose . | |
| 2,543,909 | 3/1951 | Hatheway | 222/479 |
| 2,628,850 | 2/1953 | Summerville | 285/137.1 X |
| 2,841,418 | 7/1958 | Keating et al. | 285/194 |
| 3,101,205 | 8/1963 | Benham | 285/162 |
| 3,217,400 | 11/1965 | Illesy et al. | 285/423 X |
| 3,221,572 | 12/1965 | Swick | 74/501 |
| 3,469,863 | 9/1969 | Riester et al. | 285/137.1 |
| 3,640,552 | 2/1972 | Demler, Sr. et al. | 285/137.1 X |
| 3,654,382 | 4/1972 | Rubright | 174/153 G |
| 3,757,824 | 9/1973 | Parkhurst et al. | 137/798 |
| 3,986,734 | 10/1976 | Davis | 285/158 |
| 4,005,882 | 2/1977 | Rickel et al. | 285/194 |
| 4,007,952 | 2/1977 | Fiddler | 285/137.1 |
| 4,023,834 | 5/1977 | Ewing et al. | 285/235 |
| 4,448,470 | 5/1984 | Peterson | 339/91 R |
| 4,482,172 | 11/1984 | DeVera et al. | 285/137.1 |

FOREIGN PATENT DOCUMENTS

| | | | |
|---|---|---|---|
| 61399 | 4/1968 | German Democratic Rep. | 285/137.1 |
| 1156031 | 6/1969 | United Kingdom | 285/137.1 |

Primary Examiner—Thomas F. Callaghan
Attorney, Agent, or Firm—Pennie & Edmonds

[57] ABSTRACT

A conduit harness connector assembly comprising: an elastomeric female member having a body portion with first and second opposite sides and at least one integrally formed flexible, stretchable tube extending from one side thereof and bore extending through the tube and through to the second side of the body, each tube having a predetermined internal diameter; a first set of conduits wherein a separate conduit of the set extends into each of the flexible tubes, each of the conduits having an outer diameter greater than the inside diameter of the tubes, which are stretched over them to provide an elastomeric fit; a comparatively rigid male member having first and second opposite sides wherein a tube extends from one side thereof for each bore in the body portion of the female member and for insertion thereinto from the second side of the body portion and means for separately connecting a second set of individual conduits in fluid communication with each of the tubes thereof. A further embodiment of the invention comprises a single male member constructed of a relatively rigid material and having at least one non-flexible tube extending from a first and a second side thereof, connected at either side to a female member, which may be constructed of an elastomer or a thermoplastic material. Alternately, each of the non-flexible tubes extending from said male member may be connected to a separate flexible female tubular member, into the remaining open end of which is inserted a vacuum conduit.

30 Claims, 8 Drawing Sheets

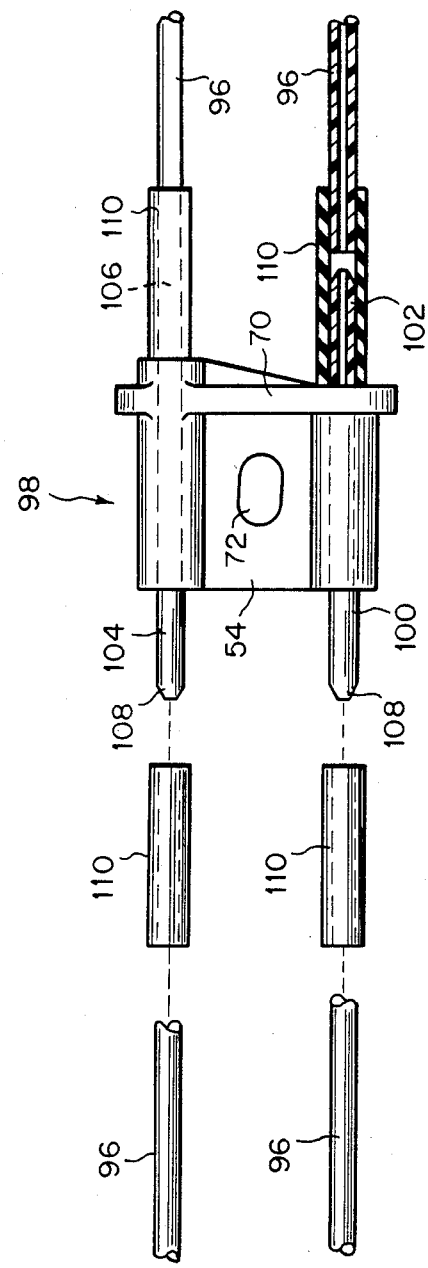

CONDUIT HARNESS CONNECTOR ASSEMBLY

TECHNICAL FIELD

The invention pertains to the field of fluid connectors, particularly pneumatic and vacuum connectors.

BACKGROUND OF THE INVENTION

Vacuum control connectors have heretofore commonly included a resilient body having one or more axially disposed bores. These bores are normally secured at one end in fluid connection with a vacuum control line and adapted for frictional engagement at the other end with a vacuum nipple of a vacuum control device.

As motor driven vehicles have become smaller and their control systems more sophisticated, various problems have arisen with the prior art vacuum control connectors. One of the problems which has arisen is providing vacuum connectors across body panels which are designed to isolate two regions. One example of such a panel is the firewall of an automobile which separates the engine and passenger compartments.

When an aperture was cut in the body panel to allow the prior art vacuum connectors to pass through, the air in the regions on either side of the panel was able to intermix through the connector aperture. Another problem which has arisen is that friction fit connectors were subject to being pulled from the control device, causing the control function to be lost. Yet another problem has arisen in gaining access to restricted regions for interconnecting the vacuum connectors and the vacuum control devices. Generally, the vacuum control device was mounted first, often with a restricted region around its vacuum connection nipples into which the vacuum control connector was maneuvered for coupling. In light of these difficulties, various attempts have been made to overcome these deficiencies.

U.S. Pat. No. 3,757,824 to Parkhurst et al. relates to a vacuum tube and connector assembly for use in a control system including a valve with multiple male outlets. The assembly comprises a plurality of tubes for connecting different ones of the male outlets of the valve with the other parts of the control system. The assembly further includes female connectors on the ends of the tubes which are adapted to mate with the male outlets of the valve and communicate with the tubes.

The tube and connector assembly further comprises a connector housing having a plurality of tapered openings for receiving the female terminals in order to align them with the male outlets of the valve. The female terminals are positioned within the openings of the housing by pulling on the tubes to frictionally engage the connector housing in an interference fit so as to align the female connectors with the male outlets for connection therewith.

U.S. Pat. No. 4,007,952 to Fiddler discloses an apparatus which permits a plurality of tubes to be sealably connected in close proximity to ports or other tubes via a relatively elastic block. The block is pressed against a relatively non-elastic base plate with the ports of the plate aligned with the channels of the block so that cross communication between the tubes is prevented. Each tube housed in the block is positioned in individually sealed communication with a port in the base plate.

The apparatus includes a multiple tube connector, a resilient block and a clamp bar comprising one subassembly. The block is sealably connected on a base plate which connects the block and tubes to a device which controls the channeling between the tubes connected thereto. The apparatus seals the channels opening through the face of the block against the relatively non-resilient base plate surface in alignment with ports in the base plate. The base plate has means for gripping the clamp bar on the block and ports with a raised bead and a counterbore at each one to assure alignment between the channels and ports and to provide against occluding a channel or port due to flow of the resilient block under clamping force. In operation, two blocks with tubes and a base plate are connected to opposite sides of a double-sided base plate at a location such as the firewall of an automobile or the bulkhead of a plane or ship.

U.S. Pat. No. 4,448,470 to Peterson discloses a coupling member with four equiangularly spaced fingers at one end and two deflectable tabs at the other end which cooperate to couple a pair of electrical connectors.

U.S. Pat. No. 4,482,172 to De Vera et al. discloses a dual sealing fluid connector for joining fluid lines with a vacuum control device. The connector further provides a seal and a panel through which it extends to isolate the regions on either side of the panel from one another. While the connector does have a resilient body for extending through an aperture in the panel, there is no disclosure of a locking tab for securing the connector with the vacuum control device.

U.S. Pat. No. 4,023,834 to Ewing et al., for a push-type coupling and conduit pipe assembly, describes an elastomeric sleeve for joining pipe sections without the use of an adhesive to provide water-tight, pull-out resistant joints which will accommodate significant bending and shearing forces without failure. The coupling is comprised of a specified combination of an elastomeric binder and a helically wound fibre.

SUMMARY OF THE INVENTION

Applicant has invented a conduit harness connector assembly which overcomes the deficiencies disclosed in the prior art. A first embodiment of applicant's conduit harness connector assembly comprises a female member constructed of an elastomeric material, such as Santoprene ® and having a body portion with first and second opposed sides. The second side of the body portion is provided with a flange which prevents more than a predetermined portion of the connector assembly from passing through an aperture in the firewall of an automobile in which the assembly is preferably mounted. The body portion is further provided with notches along its periphery to enable one to reduce the diameter of the connector assembly by compressing the notches for insertion of the connector into the aperture.

The body portion further comprises four integrally formed flexible and stretchable tubes extending from one side of the body portion opposite the flange. Each tube is provided with a bore extending therethrough and thereafter through said body portion to the opposite side. Each bore has a predetermined inside diameter and is provided with a stop means located within the body portion which comprises a bore segment having a reduced diameter in comparison to the remainder of the bore.

A first set of vacuum conduits, configured and adapted for the passage of a fluid medium, such as air, is provided for attachment to the female member. A separate conduit of the set extends separately into each of the tubes on the female member, as far as the stop means within the body portion. Each of the vacuum conduits has an outside diameter greater than the inside diameter of the tubes. The tubes are therefore stretched over the vacuum conduits to form an elastomeric fit therebetween.

This embodiment further comprises a relatively rigid male member constructed of a thermoplastic composition such as polyvinyl chloride and having first and second opposed sides.

The male member further comprises four tubes extending from one side thereof for insertion into each of the bores in the female member on the side opposed to the flexible tubes. Four additional tubes also extend from the second side of the male member, each in alignment and communication with a corresponding tube on the other side of the male member. Each of these tubes is further provided with a bore segment having a reduced diameter. A second set of conduits is also provided, with a separate conduit of this set extending separately into each of the tubes which extend from the second side of the male member, as far as the stop means. These conduits are maintained in position with the use of a solvent bonding type adhesive.

A second embodiment of applicant's conduit harness connector concerns a two-port assembly having many of the same features as described above. The two-port apparatus comprises a first female member constructed of an elastomeric material, having a body portion with first and second opposed sides. The first female member also comprises two integrally formed flexible and stretchable tubes extending from one side thereof with a bore extending through each of the tubes. Each bore extends through to the second side of the body portion. Each of the bores is further provided with an enlarged chamber portion as well as stop means which comprise a segment thereof having a reduced diameter.

A first set of vacuum tubes is attached, being configured and adapted for the passage of a fluid medium such as air. A separate tube of the set extends separately into each of the tubes of the first female member as far as the reduced bore portion. Each of the vacuum tubes has an outside diameter greater than the inside diameter of the tubes extending from the first female member. The female member tubes are therefore stretched over the vacuum tubes to form an elastomeric fit.

This embodiment also includes a second male member constructed of a thermoplastic material and having first and second opposite sides. The second male member has two tubes extending from one side thereof, each of the tubes having an enlarged beveled segment on an outer terminal portion thereof. This enlarged portion is configured for locking engagement with the chamber means within each of the bores of the first female member.

In addition, two tubes extend from the second side of the second male member. Each of these tubes are in alignment with and communicate to one of the corresponding tubes extending from the first side of the male member. Each of these tubes also has an enlarged, beveled segment on its outer terminal portion.

The embodiment further includes a third female member constructed of a thermoplastic material and having a body portion with first and second opposite sides. Two integrally formed tubes extend from one side of the body portion and a bore extends through each of the tubes and through to the second side of the body portion. Each of the bores has an enlarged chamber portion which is configured and adapted for attachment with the tubes extending from the second side of the second male member. Each of the bores within the tubes is further provided with stop means comprising a segment thereof having a reduced diameter.

A second set of vacuum tubes is provided which are configured and adapted for the passage of a fluid medium, such as air. A separate tube of the set extends separately into both of the tubes of the third female member as far as the stop means. The vacuum tubes are maintained therein by the use of an adhesive, such as methylethyl ketone.

A third embodiment of applicant's conduit harness connector assembly comprises a male member, constructed of a thermoplastic material, having a first side and a second opposite side. At least one non-flexible tube extends perpendicularly from each side of said male member, wherein each of the tubes extending from said first side are in alignment and communication with the tubes extending from the second side. Each of said non-flexible tubes terminates in a bluntly tapering tip portion which is configured to facilitate the insertion of said tube into a flexible, tubular female member of a length sufficient to permit the insertion of conduit means, such as a vacuum tube, to a depth of from about ¼-½ inch from the opposite end.

Each of the flexible tubular members remain attached to the male member due to an elastomeric fit caused by the insertion of a non-flexible tube, having a relatively large outer diameter, into a flexible tubular member having a relatively smaller internal diameter. Additionally, the conduit means are maintained within each of the flexible tubular members by the combination of this elastomeric fit and an adhesive bonding. This embodiment therefore permits the assembly of applicant's conduit harness connector without the need for connecting an intervening female member to the male member thereof.

Consequently, applicant's conduit harness assembly substitutes two sets of tubes that are connected at the fire wall for one continuous set of tubes that pass through the firewall.

BRIEF DESCRIPTION OF THE DRAWINGS

FIG. 12 is a partially sectioned perspective view of a further alternate embodiment of applicant's conduit harness connector assembly.

DETAILED DESCRIPTION OF THE PREFERRED EMBODIMENTS

Figure 1:
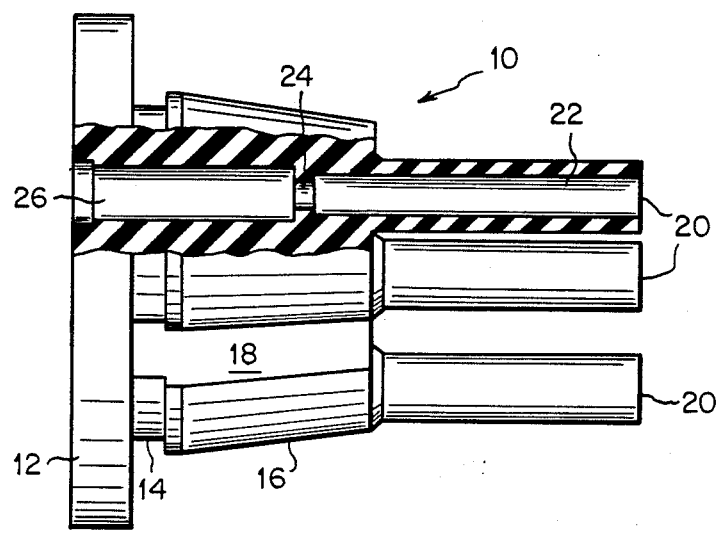
FIG. 1 is a partially sectioned side view of the female member of applicant's conduit harness connector assembly.

Referring to FIG. 1 there is illustrated female member 10 which is preferably molded of an elastomeric material such as Santoprene ®, which is manufactured by the Monsanto Corporation. Female member 10 is constructed with a body portion having first and second opposed faces and comprises flange 12, neck 14 and base 16. Neck 14 is dimensioned and configured to engage the circumferential edges of an aperture located in a structural member, preferably the firewall of an automobile, in a manner such that flange 12 remains on one side of the structural member while base 16 extends into a contiguous compartment. Female member 10 is additionally provided with notches 18 in base 16 for facilitating a locking engagement with a structural member (not shown). The compression of notches 18 temporarily reduces the diameter of base 16, thus permitting the member to pass through an aperture located in a structural member.

Extending from one face of the body portion are a plurality of integrally molded elongated tubes 20. Each tube 20 is provided with an axial bore 22, extending along the entire length of the tube, which continues through to the second side of the body portion in alignment with tubes 20. Each axial bore 22 is additionally provided with stop means 24 located within the body portion of the female member 10. These stop means 24 comprise a bore segment having a reduced diameter.

Figure 2:
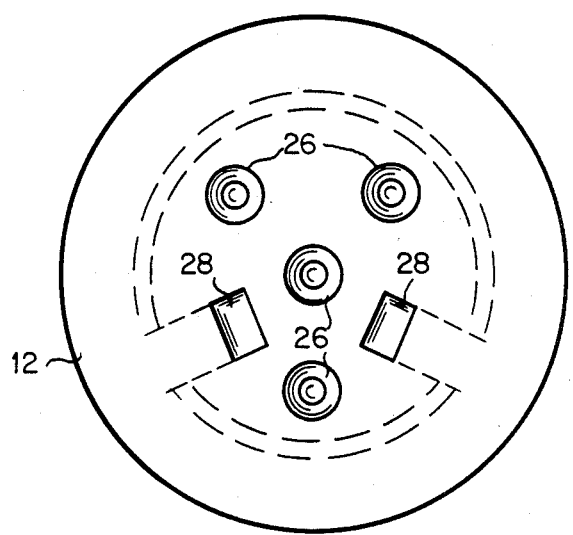
FIG. 2 is a plan view of the female member of FIG. 1.

FIG. 2 is a plan view of female member 10 illustrating the appearance of flange 12. Axial bores 22, which extend through the body portion, exit female member 10 at apertures 26. Flange 12 is also provided with slots 28 extending therethrough and configured for the insertion of locking means, preferably tab means, located upon a male member 32 (shown in FIG. 4). To facilitate the passage of the locking means through flange 12, each of slots 28 are in communication with one of the notches 18 of female member 10.

Figure 3:
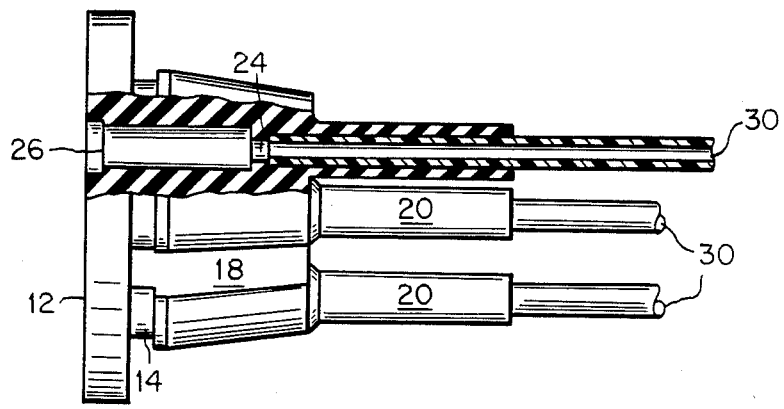
FIG. 3 is a partially sectioned side view illustrating the insertion of conduit means into the female member depicted in FIGS. 1 and 2.

FIG. 3 illustrates the insertion of conduit means 30, which are preferably vacuum lines, into bores 22 of the integrally molded elongated tubes 20. The conduits are more rigid than flexible elongated tubes 20 and are preferably constructed of a thermoplastic, such as a polyester, when utilized, for example, in the engine compartment of an automobile. Many alternate construction materials may be used, however, depending upon the application.

The hollow bore 22 of each of elongated tubes 20 is molded with an internal diameter (I.D.) of, preferably, 0.110 inch, whereas the outer diameter of the vacuum conduits is 1.125 inch. Despite the 12% variance in their diameters, the integrally molded hollow elastomeric tubes 20 are capable of expanding to permit the insertion of conduits 30. Conduits 30 are inserted until the terminal portion of each conduit reaches stop means 24 located within the body portion, which blocks any further insertion. The conduits 30 are inserted completely through elongated tubes and to the stop means located in the body portion of female member 10 in order to provide additional support for the conduits. This prevents conduits 30 from kinking when elongated tubes 20 are bent or twisted out of their normal position during assembly.

Prior to the insertion of conduits 30 into female member 10, the entire elastomeric member 10 is immersed in a bath containing a mechanical adhesive composition, such as, preferably, Thixon ®, manufactured by the Whittaker Chemical Corporation - Dayton Chemicals Division, which has been thinned to a predetermined consistency of 20% adhesive to 80% solvent with the addition of a chemical solvent such as toluene. Female member 10 is then removed from the bath and permitted to dry until it is no longer sticky to the touch. Before assembly, each conduit 30 is dipped into an activating bath of a solvent such as trichloroethanol (TCE) to a depth of about $\frac{1}{4}-\frac{1}{2}$ inch. Upon inserting conduit 30 approximately $\frac{3}{4}$ inch into each elongated tube 20, the TCE reacts with the Thixon ® residue on the interior surface of each tube 20, rendering it tacky once again and facilitating an attachment therebetween.

The adhesive, however, is only partly responsible for retaining conduits 30 within female member 10. An elastomeric fit is created when conduits 30, having a comparatively large outer diameter, are inserted into the narrower elongated tubes 20 of female member 10 which tubes are stretchable to accommodate conduits 30. The elastomeric material from which tubes 20 are molded grasps the outer surface of each conduit 30 and holds it even more firmly when tension is placed upon conduit 30 in an effort to remove it from female member 10, thus retaining the conduit in place.

By the term elastomeric fit, applicant is referring to the tension between the interior surface of elongated tube 20 and the outer surface of conduit 30. This tension is attributable to the expansion of the elastomer as conduit 30 is inserted therein. When tension is applied along the length of the inserted object in an effort to remove it from the surrounding elastomeric tube, the portion of the tube directly ahead of the object has a tendency to "neck down", i.e., decrease in diameter, thus gripping the object even more tightly and acting to prohibit its removal.

In order to quantify the effect of this elastomeric fit in maintaining each conduit 30 within a female member 10, the applicant has determined that a conduit held in position by a combination of an adhesive such as Thixon ® and an elastomeric fit requires a 15 pound pull in order to dislodge it whereas, when conduit 30 is held in place only due to the elastomeric fit described above, it can withstand only a 5 pound pull. Since the dynamic vibration caused by the movement of the vehicle in which applicant's conduit harness connector assembly is installed effectively produces less than 5 pounds of pull, however, the adhesive is not required in order to maintain conduits 30 in place, but is simply utilized in order to enhance the safety margin and facilitate installation.

Figure 4:
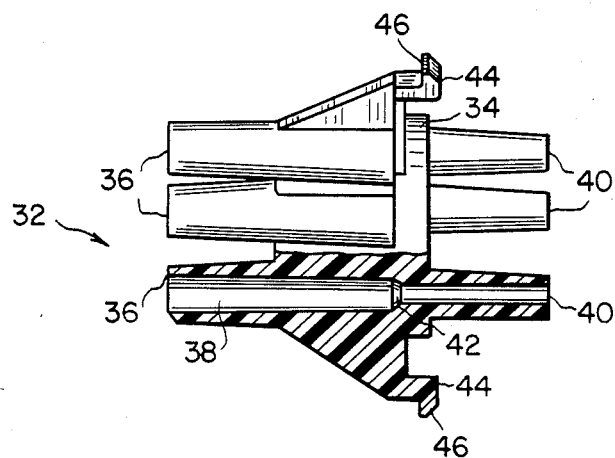
FIG. 4 is a partially sectioned side view of one embodiment of the male member of applicant's conduit harness connector assembly.

FIG. 4 is a partially sectional side view showing a preferred embodiment of male member 32 which forms a portion of applicant's conduit harness assembly. Male member 32 is preferably constructed of a molded thermoplastic composition such as polyvinyl chloride (PVC), but many other materials may also be utilized. Member 32 is rigid in construction and has a base portion 34 from each side of which a plurality of tubes 36 extend in a substantially perpendicular direction.

Each tube 36 is provided with a hollow bore 38 which extends through the entire length of male member 32. Stop means 42 is located in each of bores 38, said stop means comprising a segment of the bore having a reduced diameter. While the diameter of the interior bore portion 38 is reduced on one side of base portion 34, on the other side of base 34, it is the exterior portion 40 of each tube 36 which is tapered. Each tube 36 is additionally configured to receive conduit means 50 (shown in FIG. 6) which are inserted into bore 38 up to the stop means 42. Tapered outer portions 40 are configured so as to be inserted into apertures 26 in flange 12, which apertures are in communication with bores 22 extending entirely through the female member 10 of applicant's vacuum harness connector assembly. Such an arrangement retains base portion 34 of male member 32 flush against flange 12 of female member 10.

To secure the attachment of male member 32 to female member 10, male member 32 is provided with locking means 44, such as tab means, for insertion through slots 28 from one side of flange 12. Tabs 44 are each provided with a hooked portion 46, for engagement with the second side of flange 12. This locking arrangement acts to prevent the separation of male member 32 from female member 10 which may occur due to dynamic vibration occurring in the structural member (not shown) in which applicant's assembly is installed. The result of such a separation would be the total loss of vacuum control.

Figure 5:
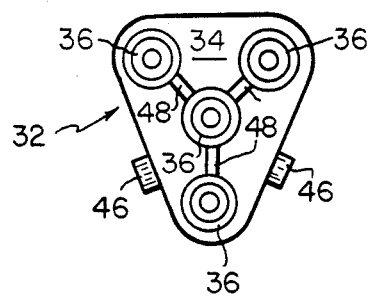
FIG. 5 is a plan view of the male member depicted in FIG. 4.

FIG. 5 is a plan view of the adapter depicted in FIG. 4. As there shown, reinforcing ribs 48 are provided to support tubes 36 and facilitate the molding of male member 32. Reinforcing ribs 48 provide additional support for tubes 36 and prevent damage to tubes 36 when rough handling occurs during manufacture, storage or assembly with female member 10.

Figure 6:
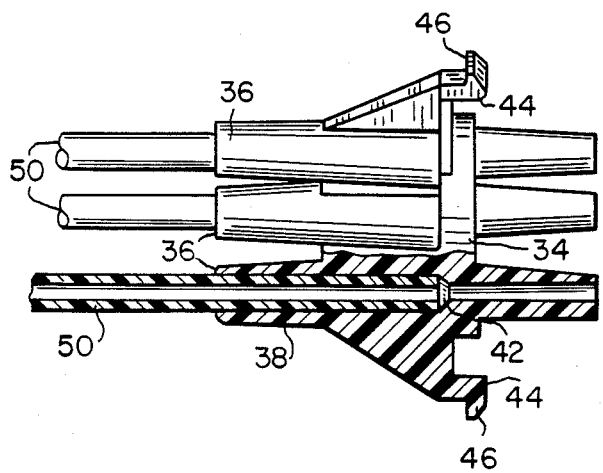
FIG. 6 is a partially sectioned side view illustrating the insertion of conduit means into the male member depicted in FIGS. 4 and 5.

FIG. 6 illustrates the insertion of conduits 50, which are preferably vacuum lines, into tubes 36 of male member 32. The conduits utilized for the preferred application are constructed of polyvinyl chloride (PVC), however, many alternate materials may be used. Prior to their insertion, conduits 50 are dipped into a solution of a solvent bonding type adhesive, such as methylethylketone (MEK) to a depth of from $\frac{1}{4}$-$\frac{1}{2}$ inch. The coated conduit 50 is then inserted approximately $\frac{1}{2}$ inch into male member 32 until the end of conduit 50 is flush with the stop 42 located in bore 38. The MEK reacts with the PVC comprising conduit 50 and tubular member 36, permitting a fusion of the two surfaces, which facilitates the retention of conduit 50 in tubular member 36.

Figure 7:
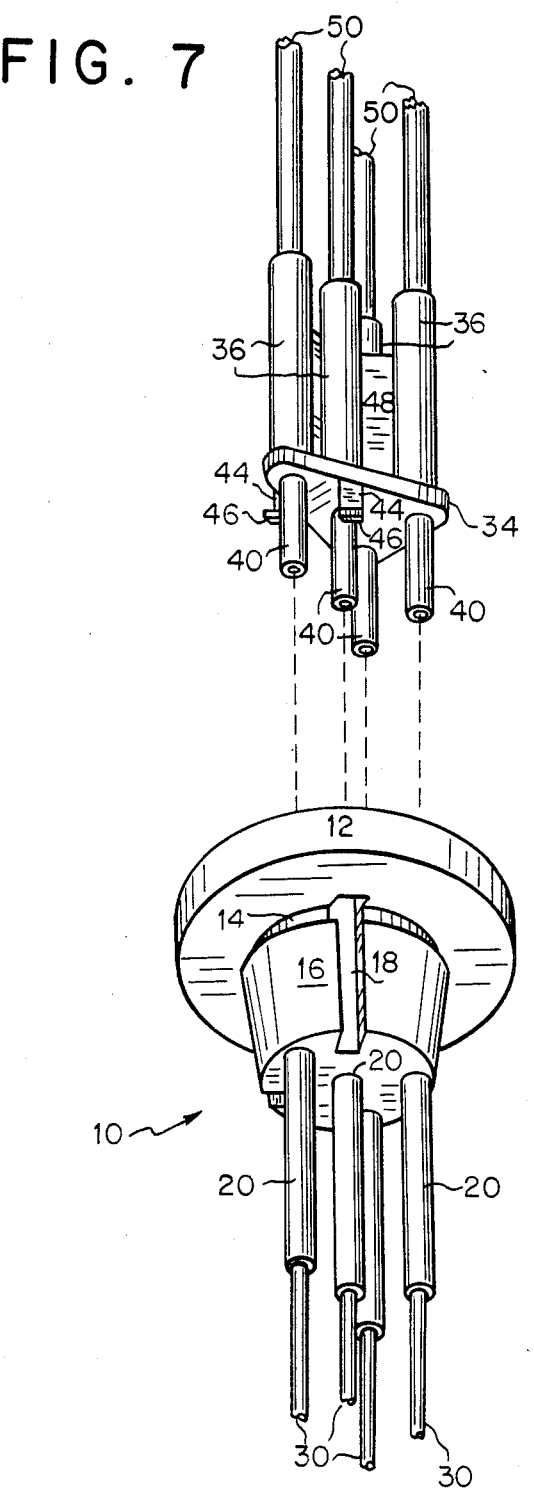
FIG. 7 is a perspective view of the conduit harness connector assembly.
Figure 8:
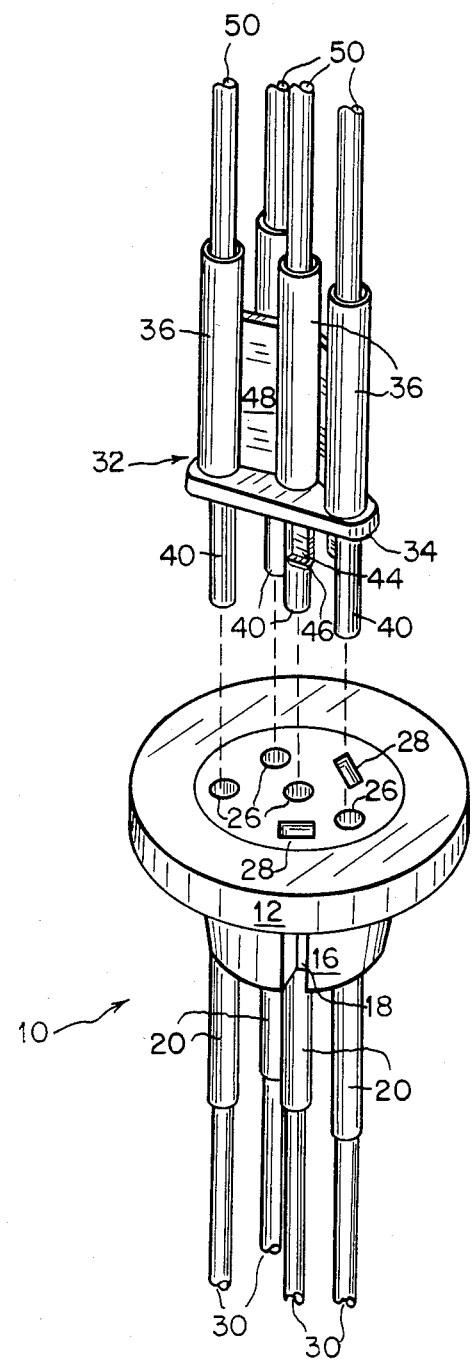
FIG. 8 is an alternate perspective view of the conduit harness connector assembly.

FIGS. 7 and 8 are perspective views illustrating applicant's conduit harness connector assembly. With conduits 30, 50 effectively locked into position within female member 10 and male member 32, respectively, as detailed above, the tapered portion 40 of each tube 36 is inserted into apertures 26 which extend entirely through female member 10. Additionally, tab means 44 are inserted into slots 28 through peripheral portions of flange 12. The hooked portions 46 of tabs 44 extend entirely through slots 28 and contact the second surface of flange 12 at the notches 18 located on the edges of female member 10.

Tabs 44 are protected from being accidentally snapped during handling in that they are positioned close to the base portion 34 and in the same plane as the tapered portions 40 of open tubular members 36. Hooked portions 46 are further protected from damage in that they do not extend far below the second side of flange 12 and they are cushioned in notches 18 when the body of connector 10 is compressed to insert it through an aperture located in a structural member.

Figure 9:
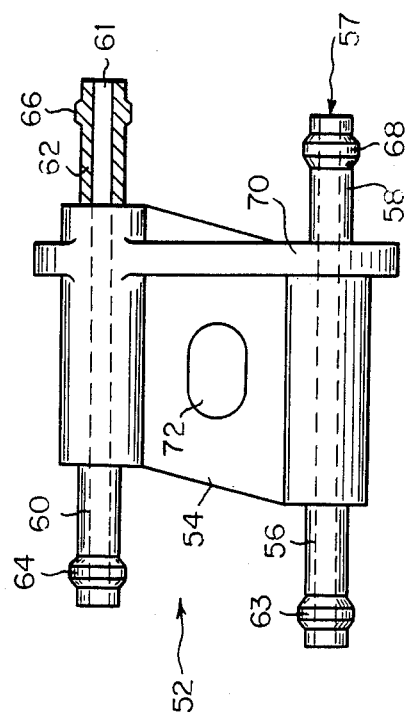
FIG. 9 is a plan view of an alternate embodiment of the male member of applicant's conduit harness connector assembly.

FIG. 9 illustrates an alternate embodiment of the male member of applicant's conduit harness connector assembly shown in FIGS. 4 and 5. This embodiment comprises a two-port male member 52, preferably constructed of a thermoplastic composition such as nylon. Male member 52 comprises a body portion 54, having a first side and a second opposite side from which body portion two non-flexible tubes 56, 58 and 60, 62 extend in parallel alignment. Each of the tubes is provided with a hollow bore 57, 61 respectively extending along the entire length of the tube and through body portion 54 as shown, partially in phantom. In addition, the terminal portions of each tube 56, 58 and 60, 62 are provided with an enlarged beveled portion 63, 64, 66, 68 which serves as locking means for attaching connector 52 to a female member 74 (shown in FIG. 10).

Body portion 54 is further provided with flange means 70 which serves to position male member 52 within an aperture in a structural member (not shown) and prevents more than a predetermined portion of male member 52 from passing through said aperture. In addition, aperture 72, located in body portion 54, provides means for retaining male member 52 in position within the structural member whereby a bracket member (not shown) which extends from the structural member is inserted through aperture 72 and is attached to the male member 52 by means such as bolts or screws (not shown).

Figure 10:
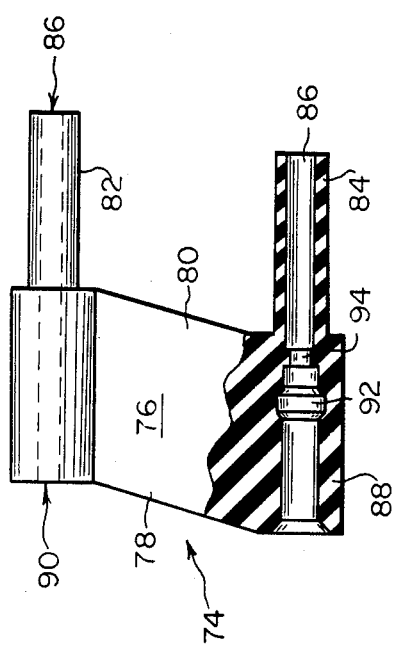
FIG. 10 is a partially sectioned side view of an alternate embodiment of the male member of applicant's conduit harness connector assembly.

In FIG. 10 there is shown a corresponding female member 74 for attachment to male member 52. Female member 74, which is an alternate embodiment of the member shown in FIG. 1, comprises a base portion 76 having a first side 78 and an opposed second side 80 from one side of which extends two elongated tubes 82, 84, integrally molded with base portion 76. Each of the elongated tubes 82, 84 has an axial bore 86 extending therethrough which communicates with one of apertures 88, 90.

Each bore 86 is provided with an enlarged chamber portion 92 along its length to accommodate one of the enlarged beveled portions 63, 64, 66, 68 upon male member 52 so as to provide a locking engagement between male member 52 and a female member 74 on both sides of body portion 54. This arrangement performs the same function as the combination of tabs 44 and slots 28 in the previous embodiments described above. Each bore 86 is further provided with a segment having a reduced diameter as at 94 so as to provide a stop for conduits 96 which are inserted into both female members of the conduit harness assembly (see FIG. 11).

In operation, a female member 74 is lockingly engaged upon both sides of male member 52. The female member 74 which is to project into the engine compartment of the automobile when the apparatus is installed is preferably molded of an elastomeric material such as Santoprene ®, while the female member 74 oriented so as to extend into the passenger compartment is preferably constructed of a thermoplastic composition such as polyvinyl chloride (PVC).

Figure 11:
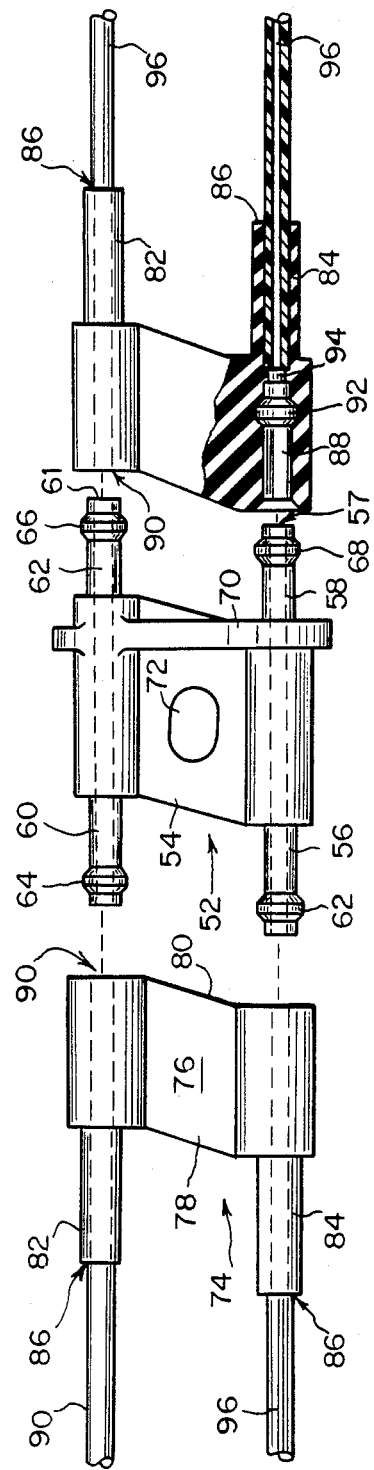
FIG. 11 is a partially sectioned perspective view of an alternate embodiment of applicant's conduit harness connector assembly.

FIG. 11 illustrates the preferred orientation for applicant's two-port conduit harness connector assembly with male member 52 in the center being coupled with a female member 74 on either side. On one side of body portion 54 a female member constructed of an elastomeric material such as Santoprene ® is attached to the free ends of the non-flexible tubes. Thereafter, one set of conduit means 96, preferably vacuum lines, are dipped in a solvent solution of TCE as described above in relation to the four-port conduit harness connector assembly. This solvent activates the Thixon ® adhesive on the inner surfaces of elongated tube members 82, 84. Conduits 96 are inserted so as to be flush with stop means 94 in both hollow tubes 82, 84 of female member 74. Conduits 96 are then retained within elastomeric female member 74 in part by the elastomeric fit created due to the variance in diametrical measurements between conduits 96 and elongated open tubular members 82, 84.

On the other side of body portion 54 a second female member 74, constructed of a molded thermoplastic such as PVC, is attached to the remaining free ends of the non-flexible tubes. A second set of conduit means 96 is dipped in a bath of MEK as described in the discussion concerning the 4 port connector, and inserted into tubes 82, 84 so as to be flush with stop means 94. A portion of the PVC is solubilized by the action of the adhesive and conduits 98 are thereafter maintained in position by the resultant fusion bond.

FIG. 12 illustrates a further alternate embodiment of the male member of applicant's conduit harness connector assembly comprising a connector 98, similar in many respects to male member 52 depicted in FIGS. 9 and 11. Similar features in both embodiments have therefore been given the same identifying numbers. In this alternate embodiment, the two parallel non-flexible tubes 100,102 and 104,106 extending from either side of body portion 54 each terminate in a bluntly tapering tip portion 108, rather than the beveled shape illustrated in FIGS. 9 and 11. These tip portions 108 facilitate the insertion of each tube 100,102 and 104,106 into a flexible tubular member 110 so as to completely cover said non-flexible tube.

Those flexible tubular members 110 which are intended to project into the relatively warmer engine compartment when the connector assembly is installed are preferably extruded from an elastomeric material such as Santoprene ®, whereas those tubular members 110 oriented so as to extend into the relatively cooler passenger compartment of an automobile are preferably extrusions of a thermoplastic composition such as PVC. Flexible tubular members 110 are retained on non-flexible tubes 100,102 and 104,106 due to the elastomeric fit created by the relatively smaller internal diameter of each flexible member 110 sliding over the larger outer diameter of a corresponding non-flexible tube until the edge of flexible member 119 reaches body portion 54.

This alternate application is further simplified in that it does not require the PVC or Santoprene ® female connector shown in FIGS. 10 and 11 since conduit means 96 are inserted directly into flexible tubular members 110, which preferably range in length from about 1¼ to 1½ inch. As discussed above with reference to FIGS. 3 and 6, conduit means 96 are retained within flexible tubular members 110 by a combination of an adhesive and an elastomeric fit, which occurs upon the insertion of conduit 96 having a relatively large outer diameter into tubular member 110 having a relatively smaller internal diameter.

The adhesive preferably chosen to assist in maintaining conduits 96 within those tubular members 110 constructed of Santoprene ® is Thixon ®, rendered tacky with the use of a chemical solvent such as toluene, whereas conduits 96 are adhesively inserted into the tubular members 110 constructed of PVC by initially dipping them into a bonding-type adhesive such as methylethyl ketone to a depth of from ¼-½ inch before sliding each of them into a flexible tubular member. There is normally a small gap or space left between the end of conduit 96 and the blunt tip 108 of the non-flexible tubes 100,102 and 104,106 due to the elastomeric resistance of the narrower flexible member 110 to the insertion of conduit means 96 having a larger external diameter.

While it is apparent that the invention herein disclosed is well calculated to fulfill the desired results, it will be appreciated that numerous modifications and embodiments, such as connector assemblies having a greater or lesser number of ports than those illustrated in the enclosed drawing figures, may be devised by those skilled in the art. It is intended that the appended claims cover all such modifications and embodiments as fall within the true spirit and scope of the present invention.

I claim:

1. A conduit harness connector assembly comprising:
   (a) female harness means having:
      (1) a body portion with first and second opposite sides; and
      (2) at least one flexible and stretchable tube extending from one side thereof and a bore extending through each said at least one tube and through to the second side of said body portion, each said at least one tube having a predetermined inside diameter;
   (b) first conduit means having at least one separate conduit wherein a separate conduit of said means extends into said each tube of said female harness means, each said conduit having an outside diameter greater than the inside diameter of its respective tube with the tube stretched thereover to form an elastomeric fit;
   (c) second conduit means;
   (d) means for connecting said second conduit means to said second side of said female harness means; and
   (e) means for locking engagement of said female harness means and said second conduit connecting means, said locking engagement means comprising an elongated member having an angular protuberance extending outwardly therefrom and a corresponding elongated channel member, having a first portion of a predetermined diameter and a second portion of a relatively larger diameter wherein said larger diameter portion is configured for an interlocking fit with said protuberance to maintain said female harness means and said second conduit connecting means in a predetermined orientation with respect to each other.

2. The conduit harness connector assembly of claim 1 wherein said means for connecting said second conduit means to said second side of said female harness means comprises:
   (a) male harness means constructed of a material which is rigid relative to the material of said female harness means and having first and second opposite sides, said male means having;
      (1) a tube extending from one side thereof for each bore in the body portion of said female means for insertion thereinto, each said tube formed integrally with said male means; and
      (2) means on said second side thereof for separately connecting a second set of individual conduits in fluid communication with each of the tubes on said first side thereof.

3. The conduit harness connector assembly of claim 1 wherein said means for connecting said second conduit means to said second side of said female harness means comprises:
(a) a female member having:
    (1) a body portion with first and second opposite sides; and
    (2) at least one integrally formed tube extending from one side thereof and a bore extending through said tube and through to said second side of said body portion, each of said tubes having a predetermined inside diameter.

4. The conduit harness connector assembly of claim 1 wherein said elongated member of the locking engagement means forms part of said second conduit connecting means and further wherein said elongated channel member forms part of said female harness means.

5. The conduit harness connector assembly of claim 1 wherein:
(a) each of said conduits comprises a vacuum line adapted and configured for the passage of a fluid medium.

6. A conduit harness connector assembly comprising:
(a) a first female member constructed of an elastomeric material and having;
    (1) a body portion with first and second opposite sides, and
    (2) at least one integrally formed flexible and stretchable tube extending from one side thereof and a bore extending through said tube and through to the second side of said body portion, each of said tubes having a predetermined inside diameter;
(b) first conduit means having at least one separate conduit wherein each separate conduit of said means extends separately into each said tube of said first female member, each said conduit having an outside diameter greater than the inside diameter of its respective tube with the tube stretched thereover to form an elastomeric fit;
(c) a second male member constructed of material which is rigid relative to the material of said first female member and having first and second opposite sides, said second member having;
    (1) a tube extending from each side thereof for each bore in the body portion of the first member and for insertion thereinto from the second side of the body portion, and
    (2) means on said second side thereof for separately connecting second conduit means in fluid communication with each of the tubes thereof; and
(d) means for locking engagement of said first female member and said second male member, said locking engagement means comprising an elongated member having an angular protuberance extending outwardly therefrom and a corresponding elongated channel member having a first portion of a predetermined diameter and a second portion of a relatively larger diameter, wherein said larger diameter portion is configured for an interlocking fit with said protuberance to maintain said first female member and said second male member in a predetermined orientation with respect to each other.

7. The conduit harness connector assembly of claim 6 wherein said female member further comprises:
(a) means located on said body portion for positioning said connector assembly and preventing more than a predetermined portion of said assembly from passing through a structural member aperture.

8. The conduit harness connector assembly of claim 6 wherein said male and said female members are locked together with the tubes of the male member inserted into the bores of the female member.

9. The conduit harness connector assembly of claim 6 wherein said first female member further comprises flange means having first and second opposite sides, said flange means extending outwardly from the second side of the body portion in a direction perpendicular to the bores in the body portion.

10. The conduit harness connector assembly of claim 9 wherein:
(a) said channel member forms part of said female member and comprises:
    (1) at least one opening extending therethrough at a location at least partially outwardly of said body portion; and
    (2) at least one notch extending along the outer periphery of said body portion in communication with said at least one opening extending through said flange means; and
(b) said elongated member forms part of said male member and comprises:
    (1) at least one tab means adapted and configured for insertion into said at least one opening through ssaid flange means, for locking engagement with said female member.

11. The conduit harness connector assembly of claim 10 wherein:
(a) each of said tab means is provided with means integrally positioned thereupon for contacting said second side of said flange means for locking engagement therewith when said male member is joined with said female member.

12. The conduit harness connector assembly of claim 10 wherein:
(a) said means for contacting said second side of said flange means is positioned within said notch and within the peripheral circumference of said flange means to facilitate the insertion of said first female member through an opening in a support member when said male member is lockingly attached to said female member.

13. The conduit harness connector assembly of claim 6 wherein:
(a) said locking engagement means comprises an enlarged beveled segment on an outer terminal portion of at least one of said tubes extending from each of said sides of said second male member and configured for locking engagement with said enlarged chamber means formed by said bore within said body portion of each of said female members.

14. The conduit harness connector assembly of claim 6 wherein said elongated member of the locking engagement means forms part of said second male member and further wherein said elongated channel member forms part of said first female member.

15. The conduit harness connector assembly of claim 6 wherein:
(a) each of said bores is provided with stop means for preventing the insertion of said conduits past a predetermined location within said body portion of said first female member.

16. The conduit harness connector assembly of claim 15 wherein:

(a) each of said stop means comprises a bore segment having a diameter less than that of one of said conduits.

17. The conduit harness connector assembly of claim 6 wherein:
(a) each of said conduits comprises a vacuum line adapted and configured for the passage of a fluid medium.

18. A conduit harness connector assembly comprising:
(a) a first female member constructed of elastomeric material and having:
  (1) a body portion with first and second opposed sides, said body portion provided with flange means on said second side for preventing more than a predetermined portion of said connector assembly from passing through a structural member aperture, said body portion further being provided with at least one notch along its outer periphery; and
  (2) four integrally formed flexible and stretchable tubes extending from one side of said body portion, having a bore extending through each of said tubes and through to said second side of said body portion, each of said bores having a predetermined inside diameter and being provided with stop means within said body portion comprising a bore segment of reduced diameter for preventing the insertion of said conduits past a predetermined location within said body portion of said first female member;
(b) a first set of vacuum tubes having a separate tube of the set extending separately into each of the tubes of said first female member, each of said vacuum tubes having an outside diameter greater than the inside diameter of said female member tubes with the female member tubes stretched thereover to form an elastomeric fit;
(c) a second male member constructed of a thermoplastic material and having first and second opposite sides, said second male member having:
  (1) four tubes extending from said second side thereof for insertion into each of said bores of said first female member from the second side of said body portion; and
  (2) four tubes extending from said first side thereof, in alignment and communication with said tubes extending from said second side thereof for separately adhesively connecting a second set of individual vacuum tubes in fluid communication with each of the tubes thereof; and
(d) means for locking engagement of said first female member and said second male member, said locking engagement means comprising an elongated member having an angular protuberance extending outwardly therefrom and a corresponding elongated channel member having a first portion of a predetermined diameter and a second portion of a relatively larger diameter, wherein said larger diameter portion is configured for an interlocking fit with said protuberance to maintain said first female member and said second male member in a predetermined orientation with respect to each other.

19. The conduit harness connector assembly of claim 18 wherein said elongated member of the locking engagement means forms part of said second male member and further wherein said elongated channel member forms part of said first female member.

20. A conduit harness connector assembly comprising:
(a) a first female member constructed of elastomeric material and comprising:
  (1) a body portion having first and second opposite sides, and
  (2) at least one integrally formed flexible and stretchable tube extending from one side thereof and a bore extending through said tube and through to the second side of said body portion, each of said tubes having a predetermined inside diameter;
(b) first conduit means having a separate conduit extending separately into each tube of said first female member, each said conduit having an outside diameter greater than the inside diameter of said tube with the tube stretched thereover to form an elastomeric fit;
(c) a second male member constructed of material which is rigid relative to the material of said first female member and having first and second opposite sides, said second member having;
  (1) a tube extending from one side thereof for each of said bores in the body portion of said first member and for insertion thereinto from said second side of the body portion;
  (2) a tube extending from said second side thereof for each of said tubes extending from said one side thereof, a bore in said second male member in communication with said tube on said one side and said tube on said second side;
(d) means for locking engagement of said first female member and said second male member, said locking engagement means comprising an elongated member having an angular protuberance extending outwardly therefrom and a corresponding elongated channel member having a first portion of a predetermined diameter and a second portion of a relatively larger diameter, wherein said larger diameter portion is configured for an interlocking fit with said protuberance to maintain said first female member and said male member in a predetermined orientation with respect to each other; and
(e) a third female member having;
  (1) a body portion with first and second opposite sides;
  (2) at least one integrally formed tube extending from one side thereof and a bore extending through said tube and through to said second side of said body portion for receiving said tube on said second side of said second male member, each of said tubes having a predetermined inside diameter; and
(f) second conduit means having a separate conduit extending separately into each said tube of said third female member.

21. The conduit harness connector assembly of claim 20 wherein:
(a) said third female member is constructed of an elastomeric material and wherein each of said conduits has an outside diameter greater than the inside diameter of said tubes with the tubes stretched thereover to form an elastomeric fit.

22. The conduit harness connector assembly of claim 20 wherein:
(a) said third female member is constructed of a thermoplastic composition and each of said second set of conduits are retained therein by adhesive means.

23. The conduit harness connector assembly of claim 20 wherein:

(a) each of said tubes extending from said one side of said second male member is in alignment with and communicates to the corresponding tube extending from said second side thereof.

24. The conduit harness connector assembly of claim 20 wherein both said first female member and said third female member further comprise:
(a) enlarged chamber means located within said body portion and formed by said bore portion of each of said integrally formed tubes.

25. The conduit harness connector assembly of claim 20 wherein:
(a) each of said bores is provided with stop means for preventing the insertion of said conduits past a predetermined location within said tubes of each of said female members.

26. The conduit harness connector assembly of claim 25 wherein:
(a) said stop means located in said bores of each of said female members comprises a body portion segment of reduced diameter.

27. The conduit harness connector assembly of claim 20 wherein:
(a) said first set and said second set of conduits each comprises a vacuum line adapted and configured for the passage of a fluid medium.

28. The conduit harness connector assembly of claim 20 which further comprises means for locking engagement of said male member and said third female member, said locking engagement means comprising an elongated member having an angular protuberance extending outwardly therefrom and a corresponding elongated channel member having a first portion of a predetermined diameter and a second portion of a relatively larger diameter, wherein said larger diameter portion is configured for an interlocking fit with said protuberance to maintain said male member and said third female member in a predetermined orientation with respect to each other.

29. A conduit harness connector assembly comprising:
(a) a first female member constructed of elastomeric material and having;
(1) a body portion with first and second opposite sides;
(2) two integrally formed flexible and stretchable tubes extending from one side thereof with a bore extending through each of said tubes and through to the second side of said body portion, each of said bores forming an enlarged chamber portion within said body portion and being further provided with stop means comprising a segment thereof having a reduced diameter;
(b) a first set of vacuum tubes configured and adapted for the passage of a fluid medium, having a separate tube of the set extending separately into each of the tubes of said first female member up to said stop means, each of said vacuum tubes having an outside diameter greater than the inside diameter of said tubes extending from one side of said first female member with said female member tubes stretched thereover to form an elastomeric fit; and
(c) a second male member constructed of a thermoplastic material and having first and second opposite sides, said second male member having;
(1) two tubes extending from one side thereof, each having an enlarged beveled segment on an outer terminal portion thereof, configured for locking engagement with each of said chamber means within said body portion of said first female member; and
(2) two tubes extending from said second side of said second male member, each of said tubes being in alignment with and communicating with one of said corresponding tubes extending from said first side thereof and each of said tubes having an enlarged beveled segment on an outer terminal portion thereof; and
(d) a third female member constructed of a thermoplastic material and having:
(1) a body portion with first and second opposite sides;
(2) two integrally formed tubes extending from one side thereof with a bore extending through each of said tubes and through to the second side of said body portion, each of said bores forming an enlarged chamber portion within said body portion, configured and adapted for attachment with the tubes extending from said second side of said second male member and further provided with stop means comprising a bore segment thereof having a reduced diameter; and
(e) a second set of vacuum tubes configured and adapted for the passage of a fluid medium, having a separate tube of the set extending separately into both of the tubes of said third female member up to said stop means and maintained therein by adhesive means.

30. A conduit harness connector assembly comprising:
(a) a first female member constructed of elastomeric material and having;
(1) a body portion with first and second opposite sides,
(2) at least one integrally formed flexible and stretchable tube extending from one side thereof and a bore extending through said tube and through to the second side of said body portion, each of said tubes having a predetermined inside diameter;
(3) flange means having first and second opposite sides, said flange means extending outwardly from the second side of the body portion in a direction perpendicular to the bores in the body portion and having at least one opening extending therethrough at a location at least partially outwardly of said body portion; and
(4) at least one notch extending along the outer periphery of said body portion in communication with said at least one opening extending through said flange means; and
(b) first conduit means wherein a separate conduit of said means extends separately into each said tube of said first female member, each said conduit means having an outside diameter greater than the inside diameter of one of said at least one tube, with a tube stretched over each said conduit of said first conduit means to form an elastomeric fit; and
(c) a second male member constructed of a material which is rigid relative to the material of said first female member and having first and second opposite sides, said male member having;
(1) a tube extending from one side thereof for each bore in the body portion of said female member and for insertion thereinto from the second side of said body portion, (2) means on said second side thereof for separately connecting second conduit means in fluid communication with each of said tubes thereof, and
(3) at least one tab means adapted and configured for insertion into said at least one opening through said flange means; each said tab means provided with means integrally positioned thereupon for contacting said second side of said flange means for locking engagement therewith, said means for contacting said second side of said flange means being positioned within said notch and within the peripheral circumference of said flange means to facilitate the insertion of said first female member through an opening in a support member when said male member is lockingly attached to said female member.

* * * * *